United States Patent [19]

Hardison

[11] Patent Number: 5,286,466
[45] Date of Patent: Feb. 15, 1994

[54] MULTI-BED COCURRENT DOWNFLOW MASS TRANSFER COLUMN WITH SPHERICAL PACKING

[75] Inventor: Leslie C. Hardison, Barrington, Ill.

[73] Assignee: Ari Technologies, Inc., Palatine, Ill.

[21] Appl. No.: 682,544

[22] Filed: Apr. 8, 1991

[51] Int. Cl.⁵ .................................. C01B 17/16
[52] U.S. Cl. ........................... 423/220; 423/231; 422/140; 422/142
[58] Field of Search ............... 423/231, 220; 422/140, 422/141, 142, 176; 210/795, 678; 502/527

[56] References Cited

U.S. PATENT DOCUMENTS

| | | | |
|---|---|---|---|
| 4,011,304 | 3/1977 | Mancini et al. | 423/573 G |
| 4,108,682 | 8/1978 | Takeda et al. | 134/25 R |
| 4,125,597 | 11/1978 | Fleck | 423/573 R |
| 4,189,462 | 2/1980 | Thompson | 423/573 G |
| 4,218,342 | 8/1980 | Thompson | 252/431 C |
| 4,374,104 | 2/1983 | Primack | 423/226 |
| 4,455,287 | 6/1984 | Primack et al. | 423/573 R |
| 4,622,212 | 11/1986 | McManus et al. | 423/226 |
| 4,668,405 | 5/1987 | Boze | 210/795 |
| 4,719,020 | 1/1988 | Elmaleh | 210/807 |

FOREIGN PATENT DOCUMENTS

| | | | |
|---|---|---|---|
| 2702972 | 7/1977 | Fed. Rep. of Germany | 210/678 |
| 61-204020 | 9/1986 | Japan | 422/176 |

*Primary Examiner*—Gary P. Straub
*Assistant Examiner*—Timothy C. Vanoy
*Attorney, Agent, or Firm*—Allegretti & Witcoff, Ltd.

[57] ABSTRACT

A packed mass transfer tower for establishing intimate gas-liquid contact and efficient mass transfer that is less susceptible to gas or liquid channeling, gas surging and uneven distribution of gas or liquid across the cross-sectional area of the tower. The packed tower includes a mobile bed mass transfer stage including a packed bed of mobile packing material, such as hollow spheres.

16 Claims, 2 Drawing Sheets

MULTI-BED COCURRENT DOWNFLOW MASS TRANSFER COLUMN WITH SPHERICAL PACKING

BACKGROUND OF THE INVENTION

1. Field of the Invention

This invention relates to packed tower or packed column structures used for intimate contact between a gas and a liquid to effect mass transfer therebetween. More particularly, this invention relates to a mobile packing material arrangement for a packed tower that provides unique advantages when the method of using the tower includes cocurrent downflow contact between gas and liquid, and provides new and unexpected results in cleaning the packing material. The method of contacting gas and liquid downwardly over a bed of mobile packing material provides intimate contact between gas and liquid, and is particularly useful for gas-liquid mass transfer in relatively large absorption towers having a cross-sectional area more than about 3 ft$^2$, where gas channeling, and surging of gas and packing material is most prevalent using counterconnect flow of gas and liquid. This invention is particularly useful in gas-liquid contacting processes where the packed tower or column is prone to undergo plugging due to the formation of solid material as a result of the gas-liquid contacting process.

2. Related Technology

It is well known that packed towers or columns are often useful for efficient gas-liquid contact to provide interactions, reactions and other mass transfer operations between gas and liquid. However, in some such operations the fluid passing through the packed bed contains suspended solid particles that tend to accumulate on the packing, eventually resulting in a reduction in gas-liquid volumetric flow rates and, in extreme cases, plugging of the tower. In particular, when such solids are being formed by chemical means within the tower, such as by crystalization of salts from solution or by precipitation of sulfur by oxidation of soluble surfides, the newly formed solid particles are prone to deposition on any surfaces with which they come into contact.

Such plugging problems occur, for example, when a packed tower is used with liquids or gases that contain particulate material, or when particulates are formed within the tower as a result of a chemical interaction, reaction or the like, that precipitates solids as a result of mass transfer between the liquid and the gas. For example, in flue gas scrubbing that utilizes a liquid stream that includes an aqueous solution or suspension of limestone or the like, to remove sulfur dioxide contained in a gas stream, a calcium sulfate precipitate is formed in the tower, and the resulting aqueous slurry causes plugging problems. Another example is a gas-liquid interphase oxidation process for removal of hydrogen sulfide from a gas stream in which the scrubbing liquid is an oxidizing solution that effects oxidation of hydrogen sulfide to form elemental sulfur particles. Such particles may cause plugging of packed towers, requiring periodic shutdown of the process for a difficult and time consuming cleaning of the tower.

Some prior processes used packed towers for contact of hydrogen sulfide ($H_2S$)-containing gases with an aqueous iron-chelate solution or a so-called "Stretford"-type alkaline vanadium ion-containing wash solution that converts $H_2S$ to elemental sulfur ($S°$). The elemental sulfur formed is entrained in the liquid mixture, and removed from the liquid, e.g. by settling or filtration. In this type of $H_2S$ removal process, some of the sulfur settles on the packing material, thereby lowering gas and liquid flow rates and, ultimately, the sulfur plugs the tower. Mobile packing beds have been used in packed towers for sulfur removal from $H_2S$-containing gas streams but suffer from uneven gas distribution and channeling problems, particularly in larger cross-sectional area towers, resulting in decreased efficiency.

It is well known that two of the most important characteristics necessary for effective and efficient gas-liquid mass transfer in packed towers are: 1) the tower must contain adequate passages for both the liquid and the gas streams without excessive liquid holdup or pressure drop; and 2) the tower must provide good contact between liquid and gas. The requirement of good contact between liquid and gas is the most difficult to meet, especially in large towers. Ideally, the liquid, once distributed over the top of the packing, flows in thin films over all the packing surface completely down the tower. Actually, the films tend to grow thicker in some places and thinner in others, so that the liquid collects into small rivulets and flows along localized paths through the packing. Especially at low liquid rates, and in the larger towers, some of the packing surface may be dry or covered with a stagnant film of liquid. This effect is known as "channeling" and is the main reason for poor performance in large packed towers. Similarly, a countercurrently flowing gas stream in larger towers sometimes tends to follow localized paths instead of being distributed across the entire cross-section of the tower, with a consequent increase in velocity through these localized paths, and this effect is known as "surging".

The use of mobile packing beds to decrease or eliminate packing material fouling adds to the "channeling" and "surging" problems inherent in packed towers of relatively large cross-sectional area due to the tendency of the relatively light mobile packing material to collect along the sides and other localized areas of the tower, further decreasing the desired cross-sectional uniformity of gas and liquid flow. This low efficiency problem in relatively large mobile bed gas-liquid contact devices has been recognized for many years but, to date, no adequate solution to the channeling and surging problems has been achieved. Others have provided vertical partitions in the columns between grids, to provide a plurality of partitioned packing beds between grids, thereby decreasing the cross-sectional area of each separate packing bed. This partitioning has aided the gas and liquid flow uniformity, but not completely satisfactorily, and has created other problems, such as the attendant difficulty in loading and unloading packing material and making sure that loading is done uniformly within each separate compartment.

When plugging occurs in a packed column of fixed packing material, the cleaning procedure is not easy to accomplish and is sometimes ineffective. The best method of cleaning which has been developed to date involves:

a) Shutting off the gas flow;

b) Closing the liquid drain valves at the bottom of the vessel;

c) Filling the tower with water or other aqueous cleaning solution to a level above the top of the fixed packing;

d) Bubbling gas through the vessel at a relatively high rate ($\approx 20$ ACFM/ft$^2$) to achieve a lifting and agitation of the packing to free the sulfur;

e) Allowing the sulfur to settle through the cleansing solution and the packing into the bottom of the scrubber, f) Repeating d) and e) several times, g) Draining the liquid out of the scrubber; and h) Returning the scrubber to the normal service.

This procedure usually cleans the packing elements sufficiently for continued operation but, if not, the alternative involves mechanically removing the packing and washing it with water, which is very time-consuming and costly.

As an alternative to fixed packing elements, others have used a Mobile Bed Absorber (MBA) technique, using hollow plastic spheres of about the size and shape of ping-pong balls to replace the fixed packing in counterflow columns. This MBA technique has been used successfully in a number of applications, particularly in small columns. While this MBA countercurrent flow approach has proven satisfactory for small diameter towers there have been serious difficulties in larger diameter columns; i.e., those over about 2' in diamter. While the spherical hollow packing elements are almost always maintained in a sufficiently agitated state to prevent fouling with sulfur, high efficiency operation cannot be obtained unless the distribution of gas and liquid flow across the cross-section of the tower is very uniform. This uniformity becomes extremely difficult to obtain as the horizontal dimension of the scrubber approaches the vertical depth of the packing material when not aerated (static).

This uneven cross-sectional distribution of gas and liquid has caused serious problems in some large commercial units. Partitioning the fluidized bed into a number of small, parallel counterflow absorbers aids in providing more uniform gas and liquid flow, but achieving uniform gas flow within the compartments remains a problem, even with compartmentalization of stages. Also, in large cross-section towers, e.g. 12'×15' horizontal dimensions, 20 compartments measuring 3 feet by 3 feet are required, and the logistics of loading and unloading the spherical packing are difficult.

The present invention solves this gas-liquid flow problem within mobile bed packed towers, without vertically partitioning the mobile beds, by providing a method that uses cocurrent downward flow of gas and liquid over spherical mobile packing material to provide good mass transfer efficiency at an unexpectedly low pressure drop, comparing favorably with random, dumped packings, and having unexpectedly even liquid and gas flow without channeling and surging problems. The spherical shape of the light, mobile packing elements have some rotational motion during cocurrent downflow mass transfer to provide some self-cleaning and a decreased tendency to plug the tower. Further, the spherical packing shape eliminates corners and crevices between packing elements to decrease build-up of solids between packing elements. Most unexpectedly, the spherical mobile packing elements can be cleaned easily on a periodic basis, in a new, more effective and simpler manner since the spheres float in water during the cleaning cycle to separate the packing elements from the settled solids with little or no upward gas bubbling required thorugh the beds of packing material, thereby providing a liquid-filled volume for particulate settling without interference from packing material; and the spherical shape of the packing elements makes them less subject to recapture of particulates.

SUMMARY OF THE INVENTION

In brief, the present invention is directed to a packed mass transfer tower for establishing intimate gas-liquid contact and efficient mass transfer that is less susceptible to gas or liquid channeling, gas surging and uneven distribution of gas or liquid across the cross-sectional area of the tower. The packed tower includes a mobile bed mass transfer stage including a packed bed of mobile packing material, such as hollow spheres.

The mobile packing bed of the present invention functions in a most unusual manner 1) to act like a fixed bed of packing material by maintaining a relatively even distribution of downwardly flowing gas and liquid, and to minimize gas channeling, and surging and achieve good gasliquid contact and efficient mass transfer, while also 2) acting like a mobile bed via rotational movement of the spherical packing elements, enabling the material to self-clean due to the resulting scraping contact between adjacent spheres, and providing unexpectedly efficient cleaning of the tower upon plugging.

Accordingly, an aspect of the present invention is to provide a new and improved mass transfer tower and method of achieving efficient gas-liquid contact.

Another aspect of the present invention is to provide a new improved method of continuous gas-liquid contact using cocurrent flow of gas and liquid over mobile packing elements having a specific gravity less than about 1.0, so that the packing elements remain relatively fixed, vertically, against a lower fluid-pervious grid during mass transfer, but are capable of floating during tower flooding and during a simplified cleaning operation when the packing elements rise upwardly from the lower grid so that the packing elements are separated from each other and mechanically agitated to dislodge any accumulated solids, which may then settle downward through the liquid phase without hinderance by the floating elements, and be withdrawn from the bottom of the tower.

Another aspect of the present invention is to provide a packed tower for intimate gas-liquid contact including one or more beds of mobile packing elements that can be cleaned effectively with a technique similar to that used for random fixed packing materials except that little or no gas is required for agitation.

Still another aspect of the present invention is to provide an improved method of removing hydrogen sulfide from a hydrogen sulfide-containing gas stream with a liquid phase oxidation solution wherein hydrogen sulfide is converted to elemental sulfur, using the inventive cocurrent downward flow of gas and liquid through one or more beds of mobile packing elements.

A further aspect of the present invention is to provide an improved packed tower and method of scrubbing a contaminated gas stream providing efficient gas-liquid contact that has a reduced packed tower plugging frequency, while maintaining excellent gas-liquid contact and high solid particle removal efficiency.

Another aspect of the present invention is to provide a method of intimately contacting a gas stream with a liquid for mass transfer therebetween by cocurrently flowing the gas and the liquid downwardly over a relatively fixed bed or mobile packing elements to achieve the advantages of better gas and liquid distribution, more efficient mass transfer, and better cleaning efficiency than a countercurrent process using either a fixed bed or a mobile bed.

The steps in the simplified cleaning process of one embodiment of the present invention, compared with those for a conventional, fixed packing scrubber are shown in Table I.

TABLE I

| CONVENTIONAL FIXED PACKING | HOLLOW SPHERICAL PACKING |
|---|---|
| a) Shutting off the gas flow. | Shutting off the gas flow. |
| b) Closing the liquid drain valve at the bottom of the tower. | Closing the liquid drain at the bottom of the tower. |
| c) Filling the tower with water or other aqueous cleaning solution to a level above the top of the fixed packing. | Filling the tower with water or other aqueous cleaning solution to a level above the top of the fixed packing. |
| d) Bubbling gas through the vessel at a relatively high rate ($\approx 20 ACFM/ft^2$) to achieve a lifting and agitation of the packing. | Not required. |
| e) Allowing the sulfur to settle through the cleaning solution into the bottom of the scrubber. | Allowing the sulfur to settle through the cleaning solution into the bottom of the scrubber. |
| f) Repeating d) and e) several times. | Not required. |
| g) Draining the liquid out of the scrubber. | Draining the liquid out of the scrubber. |
| h) Returning the scrubber to normal service. | Returning the scrubber to normal service. |

Not only is this procedure simpler to accomplish from a mechanical standpoint, but it also eliminates the need for the use of agitation gas, which may introduce serious problems if the normal process gas is either unavailable during cleaning periods, or is not available at sufficient pressure to overcome the liquid head imposed by the depth of cleaning solution.

In the latter case, it may be necessary to supply an alternate gas for agitation, and to take precautions to avoid introducing the alternate gas into the normal process gas.

An example of this situation involves the treatment of a hydrogen containing fuel gas which is available at only 1 psig. This pressure is more than adequate for the normal operation of the scrubber, but cannot be used to bubble through a liquid depth of 20 feet, necessary to submerge the packing in the absorber. In this case it was necessary to use air for agitation. A separate air compressor was required and stringent vacuum and pressure purging procedures were required to avoid forming combustible mixtures of fuel gas and air before and after the cleaning cycle was carried out.

The above and other aspects and advantages will be apparent to those skilled in the art from the following detailed description of the preferred embodiment, taken in conjunction with the drawings and the appended claims.

DETAILED DESCRIPTION OF THE PREFERRED EMBODIMENT

For purposes of illutration only, and not by way of limitation, the invention will be described with specific reference to a liquid phase oxidation process for the removal of hydrogen sulfide from a gas stream. In a process of this type, e.g., the so-called Stretford process, or the process marketed under the trademark LO-CAT ® by ARI Technologies, Inc. of Palatine, Ill., a hydrogen sulfide-containing gas is contacted in a gas-liquid contactor with a suitable aqueous treating solution, e.g., an oxidizing solution containing a polyvalent metal in its higher valence state. In the contactor, hydrogen sulfide is oxidized to elemental sulfur in the form of solid particles that are entrained (e.g., suspended or slurried) in the treating solution, and the polyvalent metal is reduced to its lower valence state. The solution is subsequently regenerated by contact with air or another oxygen-containing gas to convert the reduced polyvalent metal to its higher valence state for use in the contactor. The sulfur formed in the contactor is recovered from the aqueous treating solution by flotation, settling, filtration, or any other suitable separation technique. These processes have been used with countercurrent flow of gas and liquid, and suffer from the above-described flow problems, particularly for large cross-section towers.

When using a packed tower as a contactor, in accordance with the present invention, downward flow of gas and liquid over one or more beds of spherical packing material has been found to unexpectedly provide an even distribution of gas and liquid with excellent mass transfer efficiency at low pressure drop without the channeling and surging problems that occur in relatively large cross-section towers using packed beds of mobile packing elements and countercurrent flow of gas and liquid. In the cocurrent flow method of the present invention, the contaminant-laden, e.g. hydrogen sulfide-containing gas and the aqueous treating solution are both passed downwardly through the packed bed in intimate contact with each other over the packing material. The sulfur or other solid contaminant particles formed in the tower, e.g. by the oxidation of hydrogen sulfide, tend to accumulate on the packing or on the packing support grid resulting in eventual plugging of the tower. In most instances, the plugged tower must be periodically taken out of service for removal and washing of the packing and for cleaning of the support grid.

Figure 1:
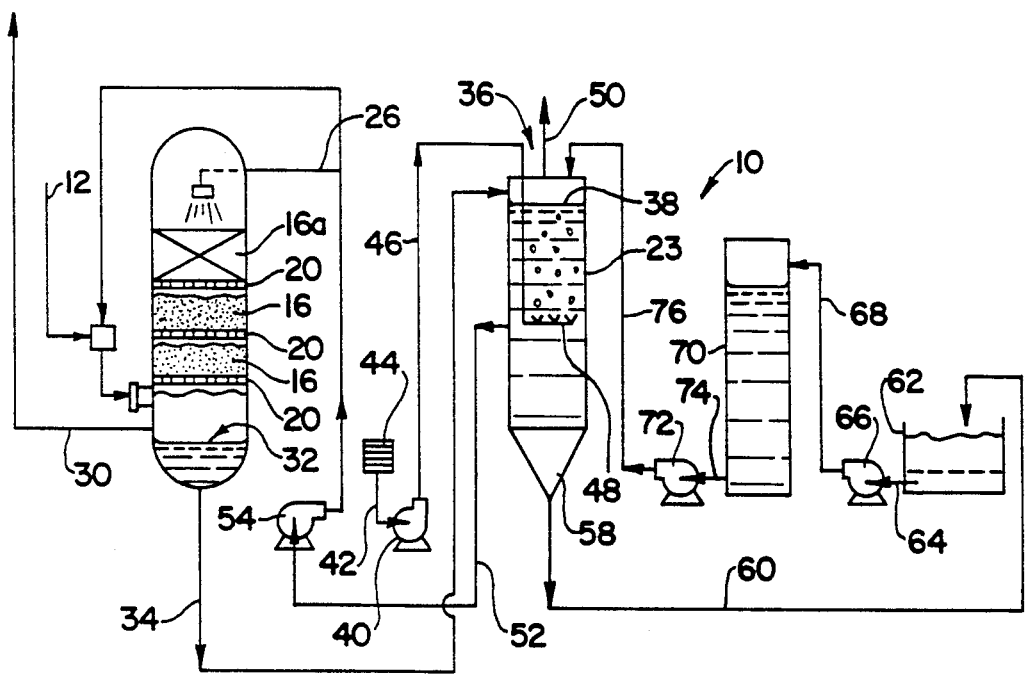
FIG. 1 is a simplified flow diagram of a gas-liquid contact oxidation process for removing hydrogen sulfide from a gas stream using the packed tower apparatus of the present invention.
Figure 2:
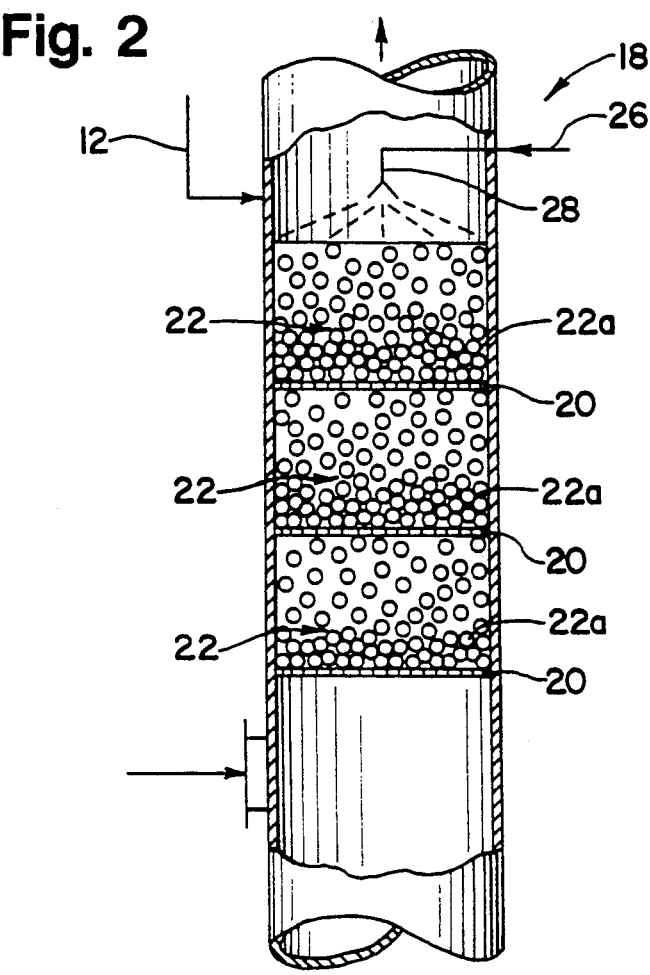
FIG. 2 is a partially broken-away, elevational view of the packed tower of FIG. 1, illustrating the closely spaced or contacting mobile packing elements within the packed beds during cocurrent gas and liquid flow and mass transfer.

It will be understood that the apparatus and process configurations shown in FIG. 1 and FIG. 2 are illustrative only and that the inventive process and apparatus using the cocurrent and cleaning methods disclosed herein, can be used with the Stretford or various LO-CAT ® processes familiar to those skilled in the art, such as those disclosed in U.S. Pat. Nos. 4,011,304; 4,125,597; 4,189,462; 4,218,342; 4,374,104; 4,455,287; 4,622,212; and 4,865,819. These patents illustrate the known chemistry for $H_2S$ gas conversion to elemental sulfur and the combinations of oxidizing/reducing metals and chelating agent combinations which will ensure that the metal will be retained in solution over a wide range of pH and other process conditions. Although iron and vanadium are the polyvalent metals which are most commonly used, chelating agent solutions of other metals including copper, platinum, tungsten, nickel, mercury, tin, lead, and the like also can be used.

FIG. 1 is an illustration of one manner of utilizing the packed tower of the present invention in the LO-CAT® sulfur removal process, generally designated by reference numeral 10, but the packed towers of the present invention also can be used with Stretford and other processes, using cocurrent downward flow of gas and liquid.

A feed gas stream containing hydrogen sulfide is introduced thorugh conduit 12 to a venturi mixer 14 where the gas is intimately premixed with regenerated chelated iron solution supplied to the mixer 14 through conduit 16. The outlet from the mixer 14 communicates with an upper portion of a vertical single or multi-bed packed scrubbing tower, generally designated by reference numeral 18. Packing support grids 20 are mounted in the tower 18, as shown, to define a volume for a relatively fixed bed of mobile packing material, generally designated 22. Preferabilty, the relatively fixed bed 22 is formed of spherical elements, such as spherical hollow packing elements 22a. One or more loosely packed beds 22 of discrete spherical mobile packing elements 22a is supported on an associated grid 20. Regenerated treating solution is supplied to an upper portion of the tower 18 thorugh conduit 26 and a spray nozzle 28. An effluent gas conduit 30 extends from the upper portion of the tower 18 above the spray nozzle 28.

The packing elements 22a are vertically relatively stationary during mass transfer between gas and liquid because of the cocurrent downward flow of gas and liquid over the spherical mobile packing elements 22a in the packed bed(s) 16. Some rotational movement of spherical packing elements 22a occurs during mass transfer, however, to provide some self-cleaning of the packing elements 22a, and the mobile elements 22a require cleaning less frequently than a process utilizing fixed packing elements. Further, the spherical shape of packing elements 22a eliminate corners and crevices normally associated with fixed packing elements that tend to collect solid particulate matter more easily than the spherical packing elements 22a of the present invention.

Most unexpectedly, the spherical mobile packing elements 22a can be cleaned easily on a periodic basis, in a new, more effective and simpler manner since the spheres float in water during the cleaning cycle to separate the packing elements from the settling solids with little or no upward gas bubbling required through the beds of packing material. In this manner, a liquid-filled volume within the tower is provided for particulate settling without interference from packing material; and the spherical shape of the packing elements 22a are less subject to recapture of particulates.

Figure 3:
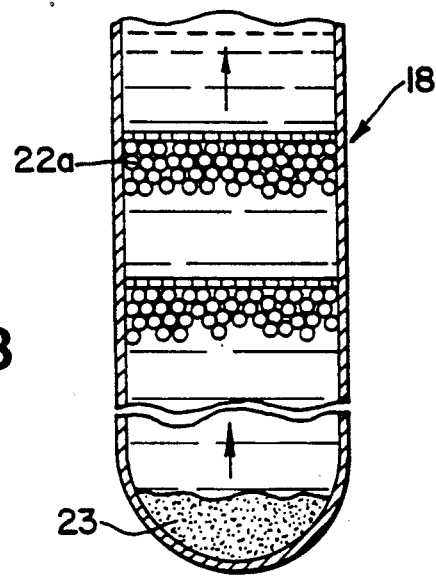
FIG. 3 is a partially broken-away, elevational view of the packed tower of FIG. 1, illustrating the floatation of mobile packing elements and solids settling within the packed beds during the cleaning operation.

As best shown in FIG. 2, the mobile packing elements 22a of each bed 22 of packing material are reltaively fixed against a lower fluid-pervious grid 20 during mass transfer and, therefore, do not require much free volume above the static volume of mobile packing elements 22a. The typical use of mobile packing elements in a countercurrent process requires substantial free height above the static height of mobile packing elements since the elements are agitated and aerated by upwardly flowing gas to vertically expand during operation of tower 18 between upper and lower grids 20 that confine each bed of mobile packing elements. In accordance with an imporatant feature of the present invention, the upper and lower grids 20 that confine each bed 22 of spherical mobile packing elements 22a should be spaced sufficiently with respect to the volume of packing elements 22a therebetween, such that by filling the tower with water (above the uppermost tower grid 20 that confines packing elements 22a as shown in FIG. 3) the packing elements will float to contact the upper grid 20 of each bed 22, leaving a free space above the lower grid 20 of each bed 22 sufficient to prevent dislodged solid particles from re-accumulating between packing elements 22a during the cleaning operation. In this manner, particulate mateiral 23 (FIG. 3) washed from the packing elements 22a during the cleaning operation will not settle onto and between other packing elements 22a to achieve more effective and more efficient cleaning of the tower 18. Raising the packing elements 22a to prevent contact of the packing elements 22a with a lower grid 20 during the cleaning operation provides the advantages of 1) substantial movement of the packing elements 22a thereby dislodging solids caught between adjacent elements and between packing elements and the lower grid 20; and 2) eliminating the smallest and most troublesome plugging volumes between lowermost packing elements 22a and the lower grid 20 of each bed 22, where dislodged solid particles tend to re-accumulate during prior art cleaning operations.

The cleaning is carried out whenever "plugging" is sufficiently severe as to cause operating problems. This may be apparent as:
1) Decreased scrubbing efficiency, indicating nonuniform fouling of the bed which results in channeling of the gas or liquid or both;
2) Increased gas pressure drop through the bed; or
3) Irregular or varying pressure drop, indicating that the liquid is periodically accumulating and restricting the gas flow.

When such symptoms become so severe as to interfere with operation of the scrubbing system, the gas flow must be stopped and the cleaning procedure initiated. In practice, this is most easily accomplished by providing two parallel towers, one of which is in service and the other in reserve or in the cleaning process. Those skilled in process design can envision other practical arrangements for permitting continued operation while the cleaning procedure is being carried out. Small units, or those which are only needed intermittently, may simply be taken out of service for cleaning.

The basic procedure, as outlined previously, involves first closing an outlet valve on the process gas leaving the vessel to stop the gas flow. The vessel need not be depressured or purged, but can remain essentially full of the process gas. The solution discharge valve at the bottom of the vessel is then closed, and the liquid entering at the top is allowed to accumulate as rapidly as it can be pumped in.

In the case of a vessel 12 feet in diameter with a liquid rate of 1080 GPM, a single pair of packing grids spaced 5 feet apart, and a normal 5 feet of freeboard above the normal liquid level, a volume of 10 ft $\times$ 113.1 ft$^2$ or 8460 gallons must be filled, which will take just about 7.8 minutes.

At this point, the packing should have been lifted to the maximum extent possible with an upper retaining grid in place, and any accumulated sulfur will have been freed and will have fallen off.

The liquid outlet valve can be opened, allowing the liquid to fall to the normal liquid level (which flushes out the accumulated sulfur), and the discharge gas flow valve can be reopened.

This whole procedure should be capable of accomplishment in 10 to 15 minutes, as compared with many hours were the use of agitation air necessary.

The feed gas passes downwardly through the packed bed(s) 22, and treating solution from the spray nozzle 28 passes downwardly through the bed(s) 22 in cocurrent contact with the gas stream. The treated gas, which is substantially free of hydrogen sulfide, is removed from the lower portion of the tower 18 through conduit 30. A liquid slurry of treating solution and suspended sulfur particles accumulates in the lower portion of the tower 18, as indicated by the upper liquid level 32, and the slurry is withdrawn at a controlled rate through conduit 34.

The used treating solution containing reduced metallic ions, e.g., reduced forms of iron and vanadium ions, is regenerated by passing the slurry from conduit 34 into an upper portion of an oxidizer vessel generally designated 36 where the slurry accumulates, as shown by the upper liquid level 38. Air is supplied to the oxidizer 36 by means of a blower 40 having an inlet conduit 42 associated with gas filter 44, and an outlet conduit 46 connected to a sparger ring 48 located in the oxidizer vessel 36 substantially below the liquid level 38. Air from the sparger ring 48 bubbles upwardly through the used treating solution and oxidizes the metallic ions to their higher valence state. The air, having a slightly diminished oxygen content, is vented from an upper portion of the oxidizer vessel 36 thorugh conduit 50. The regenerated treating solution is withdrawn from the oxidizer vessel 36, below the sparger ring 48 through a sucstion conduit 52 by means of recirculating pump 54 and is supplied to the tower 18 thorugh a discharge conduit 56 connected to tower inlet conduits 26 and 16.

In the oxidizer vessel 36, a major portion of the sulfur settles to a cone-shaped bottom portion 58 so that the treating solution withdrawn through conduit 52 for recirculation to the tower 18 contains only a minor amount of sulfur. A dense slurry of sulfur particles is supplied from the bottom portion 58 of oxidizer vessel 36 through conduit 60 to a sulfur filter 62. The sulfur-free filtrate is withdrawn from the filter through conduit 64 and pump 66 and pumped through conduit 68 to a surge tank 70. A pump 72 withdraws filtrate from the tank 70 through conduit 74 and returns the filtrate through a discharge conduit 76 to an upper portion of the oxidizer vessel 36.

The contacting of the feed gas with the treating solution in the tower 18 may be carried out at ambient temperature and pressure conditions, but temperatures of from about 5° C. to about 65° C. and pressures ranging from subatmospheric to 100 atmospheres or greater can be used. A pH ranging from about 6 to about 13, particularly from about 6 to about 10.5, is preferably maintained by adding alkaline or acidic material as required. The redox potential of the solution may be used as a measure of catalyst activity as reflected by the ratio of ferric to ferrous ions in solution. Maintaining a redox potential of from about $-50$ to about $-300$, as measured by a calomel electrode, is desirable.

FIG. 2 shows, schematically, the structure of a preferred embodiment of the gas-liquid contact scrubbing tower 18, having a number of beds 22 of mobile packing material 22a with sufficient space for vertical mobile packing element movement within each compartment or stage during the cleaning operation, described in more detail with reference to FIG. 3. Each bed of mobile packing material 22a is supported in the tower 18 on a lower fluid-pervious grid 20. The particular design of structure of the pervious grids 20 is not critical to the practice of the invention, but the purpose of the grids is to support and separate the respective mobile packing elements into their respective zones or stages of the tower 18 while allowing relatively large total open area in the grids to permit the passage of gas being treated and aqueous liquid for mass transfer therebetween in the tower 18. The details of a particularly preferred grid support structure useful in the liquid-gas contact tower of this invention are described in Dowd, et al. U.S. Pat. No. 4,865,819, the disclosure of which is incorporated herein by reference.

To achieve the full advantage of the present invention, particularly for mass transfer in a process where solids are formed within the tower 18, the mobile packing elements 22a are spherical, having a diameter of about 1 centimeter to about 10 centimeters, preferably about 2 centimeters to about 5 centimeters in diameter, so that rotation movement of the packing elements 22a achieves some degree of self-cleaning of the packing elements 22a requiring less frequent shut down of the tower for cleaning. Mobile packing elements can be known forms of polypropylene or other plastic beads, of a size and density selected to be retained upon the grid structure 21 and 22, and a sufficiently low specific gravity, e.g. less than 1.0, to be easily mobilized within the gas-liquid contact apparatus 18 during the cleaning process. An example of commercially available mobile packing materials which may be used includes hollow plastic spheres manufactured by EURO-MATIC, LTD. of London, England.

The relatively fixed mobile packing bed(s) arranged in the gas-liquid contact tower 18 in accordance with this invention alleviate problems associated with low sulfur removal efficiencies in prior known fixed and mobile packing bed contact towers, and provide goods gas distribution to maintain efficient mass transfer throughout the mobile packing bed(s). With the arrangement of multiple mobile packing beds, as described, a sufficient number of stages of mobile packing material are provided to convert unexpectedly high levels of hydrogen sulfide or other contaminants from a gas being treated, as elemental sulfur or other contaminant particles that are retained in the aqueous medium. In addition, the capability of the packing elements floating to be confined against an upper grid of each packed bed 22 during the cleaning operation provides new and unexpected cleaning efficiency.

The invention is further illustrated by the following examples illustrating the use of the relatively fixed mobile packing bed, gas-liquid contact tower 18 in a process to remove hydrogen sulfide from a gas stream.

EXAMPLES

Several tests were performed for removal of $H_2S$ using cocurrent downward gas and liquid flows over hollow spherical packing. Tests were done with co-current gas and liquid flows over the packing.

The spheres gave a pressure drop that ranged from 11.2 to 12.4 inches of water at the gas linear velocity of 250–275 SCFM/SF and liquid velocities of 150–160 GPM/SF.

The iron concentration was 500 ppm. The H₂S inlet concentration was approximately 500 ppm.

The H₂S removal efficiencies varied between 91% at a solution pH of 8.07 to 99.8% at a solution pH of 9.26. The HTU varied from about 0.6 to about 1.1 feet.

The packing is very efficient from a mass transfer standpoint. The spheres float when flooded with liquid.

The data summary for the following Examples 1-7 is set forth in Table II.

TABLE II

| Example | pH | ORP (mV) | SCFM/SF | GPM/SF | DP BED (IN H2O) | PERCENT REMOVAL | HTU (FT) |
|---|---|---|---|---|---|---|---|
| 1 | 8.46 | −80 | 275 | 154 | 12.5 | 99.0 | 0.57 |
| 2 | 9.26 | −94 | 251 | 154 | 12.2 | 99.8 | 0.42 |
| 3 | 8.34 | −93 | 251 | 150 | 12.2 | 98.0 | 0.67 |
| 4 | 8.51 | −60 | 262 | 160 | 11.2 | 96.5 | 0.78 |
| 5 | 8.49 | −71 | 251 | 156 | 11.6 | 99.0 | 0.57 |
| 6 | 8.33 | −74 | 241 | 160 | 11.4 | 97.0 | 0.75 |
| 7 | 8.07 | −91 | 252 | 156 | 11.8 | 91.0 | 1.09 |

Reasonable dimensions for the downflow configuration are:

1) Multiple beds supported between grids 5 feet apart, using 3 feet of static sphere height;
2) A single bed supported on a grid with a depth of 3 feet and some means for limiting the liquid depth to, say, 4 to 6 feet above the bottom grid, and no hold down at all;
3) A single bed of depth up to 10 or 15 feet, with 4 to 6 feet of space above the static bed and beneath a top hold down grid. Depth limited by mechanical strength of balls; or
4) Same as 3, but with a liquid level limiting device in lieu of a top hold down grid.

Some Exemplary Calculations are as follows:

Take 20,000 SCFM of gas  60° F., 14.7 psia 400 ppm H₂S
500 ppm Fe
4/1 Fe/S mol ratio
1.05 solution sg Sulfur make $$\frac{20,000 \times 60 \times 400}{1,000,000 \times 379} = 1.266 \text{ mol/hr}$$

Solution rate required $$1.266 \times 4 \times 56 \times \frac{1,000,000}{500 \times 500 \times 1.05} = 1080 \text{ GPM}$$

Area required  200 FPM $$\frac{20,000}{200} = 100 \text{ ft}_2$$

$$= 11.3 \text{ ft diameter use } 12'$$

Liquid rate is $\dfrac{1080}{12^3 \cdot \frac{\pi}{4}} = 9.54$ GPM/ft²

EXAMPLE 1

| CALCULATED DATA | | INPUT DATA | |
|---|---|---|---|
| ANNUBAR AREA | .0513 SF | STACK TEMPERATURE | 71 DEG F. |
| STACK AREA | | STATIC PRESSURE | −1.1 INCHES WATER |
| RECTANGULAR | .0000 SF | WATER CONTENT | 1% |
| CIRCULAR | .4667 SF | BAROMETRIC PRESSURE | 29.95 INCHES Hg |
| ACTUAL AREA | .4667 SF | AVERAGE PITOT DELTA | .42 INCHES OF WATER |
| STACK GAS | | Cp OF PITOT TUBE | .99 |
| GAS TEMPERATURE | 71.00 DEG F. | ANNUBAR DUCT DIA. | 3.068 INCHES |
| GAS TEMPERATURE | 531.00 DEG R | LIQUID FLOW | 72 GPM |
| GAS PRESSURE | 29.87 IN Hg | PACKING DELTA P | 12.50 INCHES H2O |
| GAS MW (WET) | 28.71 LB/LB-MOLE | STACK GAS MW | 28.82 LB/LB-MOLE |
| GAS DP - PACKING | 12.50 INCHES H2O | HYDROGEN SULFIDE IN | 500 PPM |
| VELOCITY | | HYDROGEN SULFIDE OUT | 5 PPM |
| GAS | 43.16 FPS | RECTANGULAR DUCT | |
| GAS | 275.51 SCFM/SF | HEIGHT OF DUCT | .00 INCHES |
| LIQUID | 154.28 GPM/SF | WIDTH OF DUCT | .00 INCHES |
| STACK FLOW | | CIRCULAR DUCT | |
| ACTUAL/MIN | 132.9 ACFM | DIAMETER | 9.25 INCHES |
| ACTUAL/HR | 7,976.7 ACFH | HEIGHT OF PACKING | 31.50 INCHES |
| STANDARD/MIN | 128.6 SCFM | pH | 8.46 |
| STANDARD/HR | 7,714.4 SCFH | ORP | −80 mV |
| STANDARD/DAY | 185,145.0 SCFD | | |
| STANDARD/DAY | .1851 mmSCFD | | |
| MASS BALANCE | | | |
| H2S INLET | .35 LB/HR | | |
| H2S OUTLET | .00 LB/HR | | |
| H2S REMOVAL | 99.00% | | |
| SULFUR/HR | .33 LB/HR | | |
| SULFUR/DAY | 7.82 LB/DAY | | |
| LT SULFUR/DAY | .00 LT/DAY | | |
| W | | | |
| H2S INLET | .61 LB-MOLE/HR | | |
| H2S OUTLET | .01 LB-MOLE/HR | | |
| H2S PARTIAL PRESSURE | | | |
| H2S INLET | .0004991 ATM | | |
| H2S OUTLET | .0000050 ATM | | |
| LM | .0001073 ATM | | |
| KGA | 5,690.6583 LB-MOLE/HR-ATM | | |
| NTU | 4.61 NTU | | |
| HTU | .57 FT | | |
| GAS AND LIQUID RATIOS | | | |
| L/G RATIO | 559.99 GPM/1000 SCFM | | |

| -continued | | | |
|---|---|---|---|
| EXAMPLE 1 | | | |
| CALCULATED DATA | | INPUT DATA | |
| G/L RATIO | 13.39 SCFM/SCFM | | |

| EXAMPLE 2 | | | |
|---|---|---|---|
| CALCULATED DATA | | INPUT DATA | |
| ANNUBAR AREA | .0513 SF | STACK TEMPERATURE | 71 DEG F. |
| STACK AREA | | STATIC PRESSURE | −1.1 INCHES WATER |
| RECTANGULAR | .0000 SF | WATER CONTENT | 1% |
| CIRCULAR | .4667 SF | BAROMETRIC PRESSURE | 29.95 INCHES Hg |
| ACTUAL AREA | .4667 SF | AVERAGE PITOT DELTA | .35 INCHES OF WATER |
| STACK GAS | | Cp OF PITOT TUBE | .99 |
| GAS TEMPERATURE | 71.00 DEG F. | ANNUBAR DUCT DIA. | 3.068 INCHES |
| GAS TEMPERATURE | 531.00 DEG R | LIQUID FLOW | 72 GPM |
| GAS PRESSURE | 29.87 IN Hg | PACKING DELTA P | 12.50 INCHES H2O |
| GAS MW (WET) | 28.71 LB/LB-MOLE | STACK GAS MW | 28.82 LB/LB-MOLE |
| GAS DP - PACKING | 12.20 INCHES H2O | HYDROGEN SULFIDE IN | 500 PPM |
| VELOCITY | | HYDROGEN SULFIDE OUT | 1 PPM |
| GAS | 39.40 FPS | RECTANGULAR DUCT | |
| GAS | 251.51 SCFM/SF | HEIGHT OF DUCT | .00 INCHES |
| LIQUID | 154.28 GPM/SF | WIDTH OF DUCT | .00 INCHES |
| STACK FLOW | | CIRCULAR DUCT | |
| ACTUAL/MIN | 121.4 ACFM | DIAMETER | 9.25 INCHES |
| ACTUAL/HR | 7,281.7 ACFH | HEIGHT OF PACKING | 31.50 INCHES |
| STANDARD/MIN | 117.4 SCFM | pH | 9.26 |
| STANDARD/HR | 7,042.2 SCFH | ORP | −94 mV |
| STANDARD/DAY | 169,013.5 SCFD | | |
| STANDARD/DAY | .1690 mmSCFD | | |
| MASS BALANCE | | | |
| H2S INLET | .32 LB/HR | | |
| H2S OUTLET | .00 LB/HR | | |
| H2S REMOVAL | 99.80% | | |
| SULFUR/HR | .30 LB/HR | | |
| SULFUR/DAY | 7.14 LB/DAY | | |
| LT SULFUR/DAY | .00 LT/DAY | | |
| W | | | |
| H2S INLET | .56 LB-MOLE/HR | | |
| H2S OUTLET | .00 LB-MOLE/HR | | |
| H2S PARTIAL PRESSURE | | | |
| H2S INLET | .0004991 ATM | | |
| H2S OUTLET | .0000010 ATM | | |
| LM | .0000802 ATM | | |
| KGA | 6,954.1587 LB-MOLE/HR-ATM | | |
| NTU | 6.21 NTU | | |
| HTU | .42 FT | | |
| GAS AND LIQUID RATIOS | | | |
| L/G RATIO | 613.44 GPM/1000 SCFM | | |
| G/L RATIO | 12.23 SCFM/SCFM | | |

| EXAMPLE 3 | | | |
|---|---|---|---|
| CALCULATED DATA | | INPUT DATA | |
| ANNUBAR AREA | .0513 SF | STACK TEMPERATURE | 71 DEG F. |
| STACK AREA | | STATIC PRESSURE | −1.1 INCHES WATER |
| RECTANGULAR | .0000 SF | WATER CONTENT | 1% |
| CIRCULAR | .4667 SF | BAROMETRIC PRESSURE | 29.95 INCHES Hg |
| ACTUAL AREA | .4667 SF | AVERAGE PITOT DELTA | .35 INCHES OF WATER |
| STACK GAS | | Cp OF PITOT TUBE | .99 |
| GAS TEMPERATURE | 71.00 DEG F. | ANNUBAR DUCT DIA. | 3.068 INCHES |
| GAS TEMPERATURE | 531.00 DEG R | LIQUID FLOW | 70 GPM |
| GAS PRESSURE | 29.87 IN Hg | PACKING DELTA P | 12.20 INCHES H2O |
| GAS MW (WET) | 28.71 LB/LB-MOLE | STACK GAS MW | 28.82 LB/LB-MOLE |
| GAS DP - PACKING | 12.20 INCHES H2O | HYDROGEN SULFIDE IN | 500 PPM |
| VELOCITY | | HYDROGEN SULFIDE OUT | 10 PPM |
| GAS | 39.40 FPS | RECTANGULAR DUCT | |
| GAS | 251.51 SCFM/SF | HEIGHT OF DUCT | .00 INCHES |
| LIQUID | 150.00 GPM/SF | WIDTH OF DUCT | .00 INCHES |
| STACK FLOW | | CIRCULAR DUCT | |
| ACTUAL/MIN | 121.4 ACFM | DIAMETER | 9.25 INCHES |
| ACTUAL/HR | 7,281.7 ACFH | HEIGHT OF PACKING | 31.50 INCHES |
| STANDARD/MIN | 117.4 SCFM | pH | 8.34 |
| STANDARD/HR | 7,042.2 SCFH | ORP | −93 mV |

EXAMPLE 3

| CALCULATED DATA | | | INPUT DATA | | |
|---|---|---|---|---|---|
| STANDARD/DAY | 169,013.5 | SCFD | | | |
| STANDARD/DAY | .1690 | mmSCFD | | | |
| MASS BALANCE | | | | | |
| H2S INLET | .32 | LB/HR | | | |
| H2S OUTLET | .01 | LB/HR | | | |
| H2S REMOVAL | 98.00% | | | | |
| SULFUR/HR | .30 | LB/HR | | | |
| SULFUR/DAY | 7.14 | LB/DAY | | | |
| LT SULFUR/DAY | .00 | LT/DAY | | | |
| W | | | | | |
| H2S INLET | .56 | LB-MOLE/HR | | | |
| H2S OUTLET | .01 | LB-MOLE/HR | | | |
| H2S PARTIAL PRESSURE | | | | | |
| H2S INLET | .0004991 | ATM | | | |
| H2S OUTLET | .0000100 | ATM | | | |
| LM | .0001250 | ATM | | | |
| KGA | 4,457.9656 | LB-MOLE/HR-ATM | | | |
| NTU | 3.91 | NTU | | | |
| HTU | .67 | FT | | | |
| GAS AND LIQUID RATIOS | | | | | |
| L/G RATIO | 596.40 | GPM/1000 SCFM | | | |
| G/L RATIO | 12.58 | SCFM/SCFM | | | |

EXAMPLE 4

| CALCULATED DATA | | | INPUT DATA | | |
|---|---|---|---|---|---|
| ANNUBAR AREA | .0513 | SF | STACK TEMPERATURE | 70 | DEG F. |
| STACK AREA | | | STATIC PRESSURE | −1 | INCHES WATER |
| RECTANGULAR | .0000 | SF | WATER CONTENT | 1% | |
| CIRCULAR | .4667 | SF | BAROMETRIC PRESSURE | 29.95 | INCHES Hg |
| ACTUAL AREA | .4667 | SF | AVERAGE PITOT DELTA | .38 | INCHES OF WATER |
| STACK GAS | | | Cp OF PITOT TUBE | .99 | |
| GAS TEMPERATURE | 70.00 | DEG F. | ANNUBAR DUCT DIA. | 3.068 | INCHES |
| GAS TEMPERATURE | 530.00 | DEG R | LIQUID FLOW | 75 | GPM |
| GAS PRESSURE | 29.88 | IN Hg | PACKING DELTA P | 11.20 | INCHES H2O |
| GAS MW (WET) | 28.71 | LB/LB-MOLE | STACK GAS MW | 28.82 | LB/LB-MOLE |
| GAS DP - PACKING | 11.20 | INCHES H2O | HYDROGEN SULFIDE IN | 425 | PPM |
| VELOCITY | | | HYDROGEN SULFIDE OUT | 15 | PPM |
| GAS | 41.01 | FPS | RECTANGULAR DUCT | | |
| GAS | 262.34 | SCFM/SF | HEIGHT OF DUCT | .00 | INCHES |
| LIQUID | 160.71 | GPM/SF | WIDTH OF DUCT | .00 | INCHES |
| STACK FLOW | | | CIRCULAR DUCT | | |
| ACTUAL/MIN | 126.3 | ACFM | DIAMETER | 9.25 | INCHES |
| ACTUAL/HR | 7,579.2 | ACFH | HEIGHT OF PACKING | 31.50 | INCHES |
| STANDARD/MIN | 122.4 | SCFM | pH | 8.51 | |
| STANDARD/HR | 7,345.7 | SCFH | ORP | −60 | mV |
| STANDARD/DAY | 176,295.8 | SCFD | | | |
| STANDARD/DAY | .1763 | mmSCFD | | | |
| MASS BALANCE | | | | | |
| H2S INLET | .28 | LB/HR | | | |
| H2S OUTLET | .01 | LB/HR | | | |
| H2S REMOVAL | 96.47% | | | | |
| SULFUR/HR | .26 | LB/HR | | | |
| SULFUR/DAY | 6.33 | LB/DAY | | | |
| LT SULFUR/DAY | .00 | LT/DAY | | | |
| W | | | | | |
| H2S INLET | .49 | LB-MOLE/HR | | | |
| H2S OUTLET | .02 | LB-MOLE/HR | | | |
| H2S PARTIAL PRESSURE | | | | | |
| H2S INLET | .0004244 | ATM | | | |
| H2S OUTLET | .0000150 | ATM | | | |
| LM | .0001224 | ATM | | | |
| KGA | 4,036.9321 | LB-MOLE/HR-ATM | | | |
| NTU | 3.34 | NTU | | | |
| HTU | .78 | FT | | | |
| GAS AND LIQUID RATIOS | | | | | |
| L/G RATIO | 612.61 | GPM/1000 SCFM | | | |
| G/L RATIO | 12.24 | SCFM/SCFM | | | |

EXAMPLE 5

| CALCULATED DATA | | | INPUT DATA | |
|---|---|---|---|---|
| ANNUBAR AREA | .0513 | SF | STACK TEMPERATURE | 70 DEG F. |
| STACK AREA | | | STATIC PRESSURE | −1 INCHES WATER |
| RECTANGULAR | .0000 | SF | WATER CONTENT | 1% |
| CIRCULAR | .4667 | SF | BAROMETRIC PRESSURE | 29.96 INCHES Hg |
| ACTUAL AREA | .4667 | SF | AVERAGE PITOT DELTA | .35 INCHES OF WATER |
| STACK GAS | | | Cp OF PITOT TUBE | .99 |
| GAS TEMPERATURE | 70.00 | DEG F. | ANNUBAR DUCT DIA. | 3.068 INCHES |
| GAS TEMPERATURE | 530.00 | DEG R | LIQUID FLOW | 73 GPM |
| GAS PRESSURE | 29.89 | IN Hg | PACKING DELTA P | 11.60 INCHES H2O |
| GAS MW (WET) | 28.71 | LB/LB-MOLE | STACK GAS MW | 28.82 LB/LB-MOLE |
| GAS DP - PACKING | 11.60 | INCHES H2O | HYDROGEN SULFIDE IN | 500 PPM |
| VELOCITY | | | HYDROGEN SULFIDE OUT | 5 PPM |
| GAS | 39.35 | FPS | RECTANGULAR DUCT | |
| GAS | 251.82 | SCFM/SF | HEIGHT OF DUCT | .00 INCHES |
| LIQUID | 156.43 | GPM/SF | WIDTH OF DUCT | .00 INCHES |
| STACK FLOW | | | CIRCULAR DUCT | |
| ACTUAL/MIN | 121.2 | ACFM | DIAMETER | 9.25 INCHES |
| ACTUAL/HR | 7,272.7 | ACFH | HEIGHT OF PACKING | 31.50 INCHES |
| STANDARD/MIN | 117.5 | SCFM | pH | 8.49 |
| STANDARD/HR | 7,050.9 | SCFH | ORP | −71 mV |
| STANDARD/DAY | 169,222.0 | SCFD | | |
| STANDARD/DAY | .1692 | mmSCFD | | |
| MASS BALANCE | | | | |
| H2S INLET | .32 | LB/HR | | |
| H2S OUTLET | .00 | LB/HR | | |
| H2S REMOVAL | 99.00% | | | |
| SULFUR/HR | .30 | LB/HR | | |
| SULFUR/DAY | 7.14 | LB/DAY | | |
| LT SULFUR/DAY | .00 | LT/DAY | | |
| W | | | | |
| H2S INLET | .56 | LB-MOLE/HR | | |
| H2S OUTLET | .01 | LB-MOLE/HR | | |
| H2S PARTIAL PRESSURE | | | | |
| H2S INLET | .0004994 | ATM | | |
| H2S OUTLET | .0000050 | ATM | | |
| LM | .0001074 | ATM | | |
| KGA | 5,198.2252 | LB-MOLE/HR-ATM | | |
| NTU | 4.61 | NTU | | |
| HTU | .57 | FT | | |
| GAS AND LIQUID RATIOS | | | | |
| L/G RATIO | 621.20 | GPM/1000 SCFM | | |
| G/L RATIO | 12.07 | SCFM/SCFM | | |

EXAMPLE 6

| CALCULATED DATA | | | INPUT DATA | |
|---|---|---|---|---|
| ANNUBAR AREA | .0513 | SF | STACK TEMPERATURE | 69 DEG F. |
| STACK AREA | | | STATIC PRESSURE | −1 INCHES WATER |
| RECTANGULAR | .0000 | SF | WATER CONTENT | 1% |
| CIRCULAR | .4667 | SF | BAROMETRIC PRESSURE | 29.96 INCHES Hg |
| ACTUAL AREA | .4667 | SF | AVERAGE PITOT DELTA | .32 INCHES OF WATER |
| STACK GAS | | | Cp OF PITOT TUBE | .99 |
| GAS TEMPERATURE | 69.00 | DEG F. | ANNUBAR DUCT DIA. | 3.068 INCHES |
| GAS TEMPERATURE | 529.00 | DEG R | LIQUID FLOW | 75 GPM |
| GAS PRESSURE | 29.89 | IN Hg | PACKING DELTA P | 11.40 INCHES H2O |
| GAS MW (WET) | 28.71 | LB/LB-MOLE | STACK GAS MW | 28.82 LB/LB-MOLE |
| GAS DP - PACKING | 11.40 | INCHES H2O | HYDROGEN SULFIDE IN | 500 PPM |
| VELOCITY | | | HYDROGEN SULFIDE OUT | 15 PPM |
| GAS | 37.59 | FPS | RECTANGULAR DUCT | |
| GAS | 241.01 | SCFM/SF | HEIGHT OF DUCT | .00 INCHES |
| LIQUID | 160.71 | GPM/SF | WIDTH OF DUCT | .00 INCHES |
| STACK FLOW | | | CIRCULAR DUCT | |
| ACTUAL/MIN | 115.8 | ACFM | DIAMETER | 9.25 INCHES |
| ACTUAL/HR | 6,947.5 | ACFH | HEIGHT OF PACKING | 31.50 INCHES |
| STANDARD/MIN | 112.5 | SCFM | pH | 8.33 |
| STANDARD/HR | 6,748.3 | SCFH | ORP | −74 mV |
| STANDARD/DAY | 161,960.1 | SCFD | | |
| STANDARD/DAY | .1620 | mmSCFD | | |
| MASS BALANCE | | | | |
| H2S INLET | .30 | LB/HR | | |
| H2S OUTLET | .01 | LB/HR | | |
| H2S REMOVAL | 97.00% | | | |
| SULFUR/HR | .28 | LB/HR | | |

EXAMPLE 6

| CALCULATED DATA | | INPUT DATA |
|---|---|---|
| SULFUR/DAY | 6.84 LB/DAY | |
| LT SULFUR/DAY | .00 LT/DAY | |
| W | | |
| H2S INLET | .53 LB-MOLE/HR | |
| H2S OUTLET | .02 LB-MOLE/HR | |
| H2S PARTIAL PRESSURE | | |
| H2S INLET | .0004994 ATM | |
| H2S OUTLET | .0000150 ATM | |
| LM | .0001382 ATM | |
| KGA | 3,866.3837 LB-MOLE/HR-ATM | |
| NTU | 3.51 NTU | |
| HTU | .75 FT | |
| GAS AND LIQUID RATIOS | | |
| L/G RATIO | 666.83 GPM/1000 SCFM | |
| G/L RATIO | 11.25 SCFM/SCFM | |

EXAMPLE 7

| CALCULATED DATA | | INPUT DATA | |
|---|---|---|---|
| ANNUBAR AREA | .0513 SF | STACK TEMPERATURE | 69 DEG F. |
| STACK AREA | | STATIC PRESSURE | −1 INCHES WATER |
| RECTANGULAR | .0000 SF | WATER CONTENT | 1% |
| CIRCULAR | .4667 SF | BAROMETRIC PRESSURE | 29.96 INCHES Hg |
| ACTUAL AREA | .4667 SF | AVERAGE PITOT DELTA | .35 INCHES OF WATER |
| STACK GAS | | Cp OF PITOT TUBE | .99 |
| GAS TEMPERATURE | 69.00 DEG F. | ANNUBAR DUCT DIA. | 3.068 INCHES |
| GAS TEMPERATURE | 529.00 DEG R | LIQUID FLOW | 73 GPM |
| GAS PRESSURE | 29.89 IN Hg | PACKING DELTA P | 11.80 INCHES H2O |
| GAS MW (WET) | 28.71 LB/LB-MOLE | STACK GAS MW | 28.82 LB/LB-MOLE |
| GAS DP - PACKING | 11.80 INCHES H2O | HYDROGEN SULFIDE IN | 500 PPM |
| VELOCITY | | HYDROGEN SULFIDE OUT | 45 PPM |
| GAS | 39.31 FPS | RECTANGULAR DUCT | |
| GAS | 252.05 SCFM/SF | HEIGHT OF DUCT | .00 INCHES |
| LIQUID | 156.43 GPM/SF | WIDTH OF DUCT | .00 INCHES |
| STACK FLOW | | CIRCULAR DUCT | |
| ACTUAL/MIN | 121.1 ACFM | DIAMETER | 9.25 INCHES |
| ACTUAL/HR | 7,265.8 ACFH | HEIGHT OF PACKING | 31.50 INCHES |
| STANDARD/MIN | 117.6 SCFM | pH | 8.07 |
| STANDARD/HR | 7,057.6 SCFH | ORP | −91 mV |
| STANDARD/DAY | 169,381.9 SCFD | | |
| STANDARD/DAY | .1694 mmSCFD | | |
| MASS BALANCE | | | |
| H2S INLET | .32 LB/HR | | |
| H2S OUTLET | .03 LB/HR | | |
| H2S REMOVAL | 91.00% | | |
| SULFUR/HR | .30 LB/HR | | |
| SULFUR/DAY | 7.15 LB/DAY | | |
| LT SULFUR/DAY | .00 LT/DAY | | |
| W | | | |
| H2S INLET | .56 LB-MOLE/HR | | |
| H2S OUTLET | .05 LB-MOLE/HR | | |
| H2S PARTIAL PRESSURE | | | |
| H2S INLET | .0004994 ATM | | |
| H2S OUTLET | .0000449 ATM | | |
| LM | .0001887 ATM | | |
| KGA | 2,959.7837 LB-MOLE/HR-ATM | | |
| NTU | 2.41 NTU | | |
| HTU | 1.09 FT | | |
| GAS AND LIQUID RATIOS | | | |
| L/G RATIO | 620.61 GPM/1000 SCFM | | |
| G/L RATIO | 12.08 SCFM/SCFM | | |

The foregoing detailed description is given for clearness of understanding only, and no unnecessary limitations should be understood therefrom, as modifications within the scope of the invention will be apparent to those skilled in the art.

It should be understood that the present disclosure has been made only by way of preferred embodiment and that numerous changes in details or construction, combination and arrangement of parts can be resorted to without departing from the spirit and scope of the invention as hereunder claimed.

What is claimed is:

1. A method of operating a packed tower to provide mass transfer between a gas and a liquid wherein the packing material within the tower contacts solid particulate material and, therefore, the pressure drop across the tower increases due to solid particulate material entrapped between packing elements, comprising:

cocurrently flowing a gas and a liquid downwardly through a packed tower over a packed bed of mobile packing elements, said packing elements having a sufficiently low density to float in water and disposed between spaced upper and lower fluid-impervious grids, wherein the downward gas and liquid flow rates are such that the mobile packing elements are not substantially raised from the lower grid during mass transfer;

periodically stopping the flow of said gas and discharge of liquid during a cleaning cycle to remove particulate solids from the tower;

flooding the tower to cause the mobile packing elements to be raised from the lower support grid so that the particulate material can be washed from the packing elements; and flushing the particulate solids from the tower, essentially without the solids being recaptured between packing elements.

2. The method of claim 1, wherein the mobile packing elements are spherical and have a density such that the packing elements float in water.

3. The method of claim 1, wherein the mobile packing elements have a diameter of about 1 centimeter to about 10 centimeters.

4. The method of claim 3, wherein the mobile packing elements have a diameter of about 2 centimeters to about 8 centimeters.

5. The method of claim 4, wherein the mobile packing elements comprise hollow polymeric spheres having a diameter of about 2 centimeters to about 5 centimeters.

6. The method of claim 1 wherein the flooding and flushing steps are substantially without gas flow through the tower.

7. The method of claim 1 further including adding gas to the liquid in the tower while the tower is flooded for additional agitation during cleaning.

8. In a liquid phase oxidation process for removing hydrogen sulfide from a hydrogen sulfide-containing gas stream wherein said gas stream is contacted in a packed bed of mobile packing elements, supported on a lower fluid-pervious grid with a liquid oxidizing solution under conditions effective for oxidizing hydrogen sulfide to elemental sulfur to form solid particles that become entrained in said liquid solution, the improvement comprising:

cocurrently flowing gas and liquid downwardly over said packed bed, wherein the mobile packing elements are spherical and have a density such that the packing elements float in water, using flow rates of gas and liquid such that the mobile packing elements are not substantially raised from said lower grid during mass transfer between gas and liquid;

periodically stopping the flow of said gas and discharge of liquid during a cleaning cycle to remove particulate solids from the tower;

flooding the tower to cause the mobile packing elements to be raised from the lower support grid so that the particulate material can be washed from the packing elements; and flushing the particulate solids from the tower, essentially without the solids being recaptured between packing elements.

9. The improved process of claim 8 wherein said liquid oxidizing solution comprises an aqueous polyvalent metal solution.

10. The improved process of claim 9 wherein said polyvalent metal is iron.

11. The improved process of claim 9 wherein said polyvalent metal is vanadium.

12. The improved process of claim 8 wherein the mobile packing elements are spherical.

13. The improved process of claim 8 wherein the mobile packing elements have a diameter of about 1 centimeter to about 10 centimeters.

14. The improved process of claim 13 wherein the mobile packing elements have a diameter of about 2 centimeters to about 8 centimeters.

15. The improved process of claim 14 wherein the mobile packing elements comprise hollow polymeric spheres having a diameter of about 2 centimeters to about 5 centimeters.

16. The improved process of claim 8 further including adding gas to the liquid in the tower while the tower is flooded for additional agitation during cleaning.

* * * * *